(12) United States Patent
Raimarckers et al.

(10) Patent No.: US 12,723,526 B2
(45) Date of Patent: Sep. 1, 2026

(54) MODULE FOR ATTRACTING AND DETECTING DEBRIS

(71) Applicant: SAFRAN AERO BOOSTERS, Herstal (BE)

(72) Inventors: Nicolas Oscar Louis Ghislain Raimarckers, Herstal (BE); Aurélien Guy Edmond Raoul Meunier, Herstal (BE); Samuel Jottrand, Herstal (BE)

(73) Assignee: SAFRAN AERO BOOSTERS (BE)

( * ) Notice: Subject to any disclaimer, the term of this patent is extended or adjusted under 35 U.S.C. 154(b) by 413 days.

(21) Appl. No.: 18/558,877

(22) PCT Filed: May 3, 2022

(86) PCT No.: PCT/EP2022/061765
§ 371 (c)(1), (2) Date: Nov. 3, 2023

(87) PCT Pub. No.: WO2022/233818
PCT Pub. Date: Nov. 10, 2022

(65) Prior Publication Data
US 2024/0240578 A1 Jul. 18, 2024

(30) Foreign Application Priority Data
May 6, 2021 (BE) .................................. 2021/5370

(51) Int. Cl.
*F01M 1/10* (2006.01)
*B03C 1/28* (2006.01)
*G01N 15/06* (2006.01)

(52) U.S. Cl.
CPC ............... *F01M 1/10* (2013.01); *B03C 1/282* (2013.01); *G01N 15/0656* (2013.01); *F01M 2001/1042* (2013.01); *F05D 2260/80* (2013.01)

(58) Field of Classification Search
CPC ............. F01M 1/10; F01M 2001/1042; F01M 2001/1007; F01M 2001/105;
(Continued)

(56) References Cited

U.S. PATENT DOCUMENTS 4,323,843 A * 4/1982 Batham .................. F01M 11/10
324/698
4,831,362 A * 5/1989 Tsaprazis ........... G01N 15/0656
324/202
(Continued)

FOREIGN PATENT DOCUMENTS

EP 2455774 A1 5/2012
EP 3363518 A1 8/2018
(Continued)

OTHER PUBLICATIONS

Escapenet translation of FR_2598818A1, Nov. 20, 1987. (Year: 1987).*

(Continued)

*Primary Examiner* — Joseph W Drodge
(74) *Attorney, Agent, or Firm* — Emerson, Thomson & Bennett, LLC; Roger D. Emerson; Peter R. Detorre

(57) ABSTRACT

Module (60) for attracting and detecting ferromagnetic debris in an oil flow from a turbomachine, the module (60) comprising: a permanent magnet (62); a bar (64), the bottom (66) of which extends radially and is wound around a coil (70). The coil (70) is able to detect the magnetic field generated by the magnet (62) and in particular its variations when a ferromagnetic particle comes into the vicinity of the magnet (62).

13 Claims, 6 Drawing Sheets

(58) Field of Classification Search
CPC ...... F01M 2001/1057; F01M 2001/123; B03C 1/282; B03C 2201/18; B03C 2201/30; B03C 2201/32; B03C 1/286; B03C 1/28; F05D 2260/80; F16N 2200/04; F16N 39/06; G01N 2015/0053; G01N 15/0656; G01N 33/2858; B64U 27/16; B64U 50/12; B01D 29/56; B01D 35/06; B01D 2201/20; B01D 2201/202; B01D 2221/08
See application file for complete search history.

(56) References Cited

U.S. PATENT DOCUMENTS 5,674,401 A * 10/1997 Dickert .............. G01N 33/2888
210/695
6,445,177 B1 * 9/2002 Higgins .................. F16N 29/00
411/7
2017/0036144 A1 * 2/2017 Jacquerie .................. B03C 1/30
2019/0083912 A1 * 3/2019 Remboski ............ B01D 35/147
2020/0088350 A1 * 3/2020 Basso ..................... B03C 1/286

FOREIGN PATENT DOCUMENTS

EP 3627032 A1 3/2020
FR 2598818 A1 11/1987

OTHER PUBLICATIONS

Escapenet translation of EP3363518A1, Aug. 22, 2018. (Year: 2018).*
International search report for PCT/EP2022/061765, issued on Aug. 31, 2022.

* cited by examiner

MODULE FOR ATTRACTING AND DETECTING DEBRIS

DOMAIN

The invention relates to the monitoring of lubricated mechanical members in a turbomachine. More specifically, the invention relates to the detection of ferromagnetic debris in the oil of a turbomachine. The invention also relates to a turbomachine, in particular an aircraft turbojet or an aircraft turboprop.

PRIOR ART

The presence of metal debris in the oil of a lubrication circuit indicates wear of the moving elements of a turbomachine. Thus, by analyzing the quantity and size of metal debris circulating in the oil, it is possible to estimate the health of the engine. In particular, a sudden increase in the number of debris detected can mean that a bearing or gear is wearing prematurely. Therefore, maintenance must be planned in order to avoid a breakdown or mechanical breakage.

Document EP 3 363 518 A1 discloses a system for electrical detection of the presence of ferrous particles in a fluid. This system includes both a magnet and an electric coil. In operation, ferrous particles are attracted by the magnet and disturbances in the electromagnetic field are measured to deduce the presence of debris. To prevent debris from accumulating on the magnet, this system is equipped with magnet protection strainers. The strainers also make it possible to filter debris of given dimensions so that they are not counted by the detector.

This system has a weakness because it can generate pressure losses, which are negligible for high pressures and flow rates, but which can alter the flow of the fluid for flows of lower pressure.

Another example is given in application (not yet published) BE 2020/5204.

For a sensor of this type, the particle attraction and debris detection functions can be antagonistic: the attraction of particles requires maximizing the attraction surface, so that the magnetic field generated—which decreases sharply with distance—can reach a maximum number of particles in the flow; and particle detection requires that a given particle has as large an impact as possible on the magnetic field (to pass a detection threshold) and therefore requires an attraction surface that is small.

SUMMARY OF THE INVENTION

Technical Problem

The invention aims to solve at least one of the problems encountered in the systems of the prior art. More precisely, the invention aims to propose an alternative to the known debris detection system, but having greater measurement reliability, through a design allowing both increased attraction of ferromagnetic particles and acceptable detection. particles.

Technical Solution

The invention relates to a module for attracting and detecting ferromagnetic debris in an oil flow of a turbomachine, the module comprising: a permanent magnet of a cylindrical shape; a ferromagnetic bar composed of a leg rising radially from the magnet and a cap extending circumferentially from the leg; and a coil wrapped around the foot.

The shape of the magnet defines the cylindrical coordinate system referred to later.

The foot being circumferentially thinner than the cap, it allows both the concentration of the field lines (and therefore the increase in sensitivity to the presence of a particle) and convenient winding of the coil.

The cap, more circumferentially extended, creates a larger attraction surface for the particles and thus maximizes particle capture without deteriorating the sensitivity of the module.

In a variant of the invention presenting the same advantages, the cap is of parallelepiped shape and extends from the foot, perpendicular to it.

According to an advantageous embodiment of the invention, the coil is wound around a winding support threaded onto the foot.

According to an advantageous embodiment of the invention, the cap comprises two circumferentially opposite ends each formed of a cylinder portion. This shape makes it possible to locally increase the surface of attraction.

According to an advantageous embodiment of the invention, the two ends are spaced from each other by a distance substantially equivalent to the diameter of the magnet.

This design allows the bar to intersect a greater number of field lines.

According to an advantageous embodiment of the invention, the diameter of the cylinder portions forming the ends is approximately equal to the circumferential width of the foot, and is preferably between 1.5 and 2.5 mm, in particular approximately 2 mm.

According to an advantageous embodiment of the invention, the circumferential width of the foot is between 25% and 50% of the diameter of the magnet, and is preferably approximately 2.5 mm. The field is therefore two to four times denser in the foot than in the magnet.

According to an advantageous embodiment of the invention, the radial height of the foot is approximately 50% of the diameter of the magnet, and is preferably approximately 2 mm. Thus, the hat is spaced from the magnet by a distance which is of the same order of magnitude as the radius of the magnet.

According to an advantageous embodiment of the invention, the axial length of the bar is equal to the axial length of the magnet and is in particular approximately 30 mm. It is understood that the length can be increased or reduced depending on the transverse dimension of the passage.

According to an advantageous embodiment of the invention, the ferromagnetic bar is a first bar, the module comprising a second bar arranged diametrically opposite to the first bar. The first and second bars can be identical and thus multiply the power of attraction of the particles.

According to an advantageous embodiment of the invention, the magnet comprises two diametrically opposite poles, the or each bar being arranged to the right of a pole.

Alternatively, the poles can be separated axially.

According to an advantageous embodiment of the invention, the module comprises a strainer describing at least one cylindrical portion and arranged coaxially with the magnet. Depending on its position relative to the magnet, the strainer can limit the size of the particles which reach the magnet and avoid saturation of the particles on the magnet. Alternatively, the strainer can collect the larger particles which have been attracted by the magnet without adhering to it in order to protect the pumps and organs downstream of it. The strainer is made of non-magnetic material. Its influence on the measurements is therefore negligible.

The invention also relates to a system for detecting ferromagnetic debris in an oil flow of a turbomachine, the system comprising a passage intended to be traversed by the flow and a module for attracting and detecting the ferromagnetic debris present in the flow, the module conforming to one of the embodiments described above.

By "passage", we mean a volume of the space traversed by the fluid, which can be delimited by a wall or several walls allowing a fluid to flow in at least one direction.

According to an advantageous embodiment of the invention, the module is positioned in the passage in such a way that the axis of the cylinder is perpendicular to the direction of the oil flow in the passage, the cap being arranged upstream of the magnet.

The invention finally relates to an aircraft turbojet engine comprising a lubrication group made of a one-piece body receiving several pumps and filters, several oil inlets and outlets, and a system for detecting debris, remarkable in that the system for detecting debris conforms to one of the above embodiments and is disposed in an oil inlet upstream of the pumps and filters.

It is understood that the module may include integrated or remote signal processing electronics connected wired or wirelessly to the module. The signal is processed in particular to detect variations in the magnetic field perceived by the coil.

Benefits Provided

The different technical solutions of the attraction and detection module explained above make it possible to optimize the compromise between the attraction of particles and their detection.

Inserted in an oil flow, the module also has the advantage of not disturbing the flow of the fluid any more than necessary.

Other advantages will become apparent in light of the examples described below.

BRIEF DESCRIPTION OF THE DRAWINGS

FIG. 5 shows a sectional view of the module;

FIG. 6 shows the field lines in the section of FIG. 5;

DESCRIPTION OF EMBODIMENTS

In the description which follows, the term "magnet" refers to a permanent magnet. The flow of flux in the passage at the level of the magnet takes place in a main direction of flow which is transverse to the module (perpendicular or simply secant). Upstream and downstream are understood in relation to the direction of flow of the oil flow in the passage.

Figure 1:
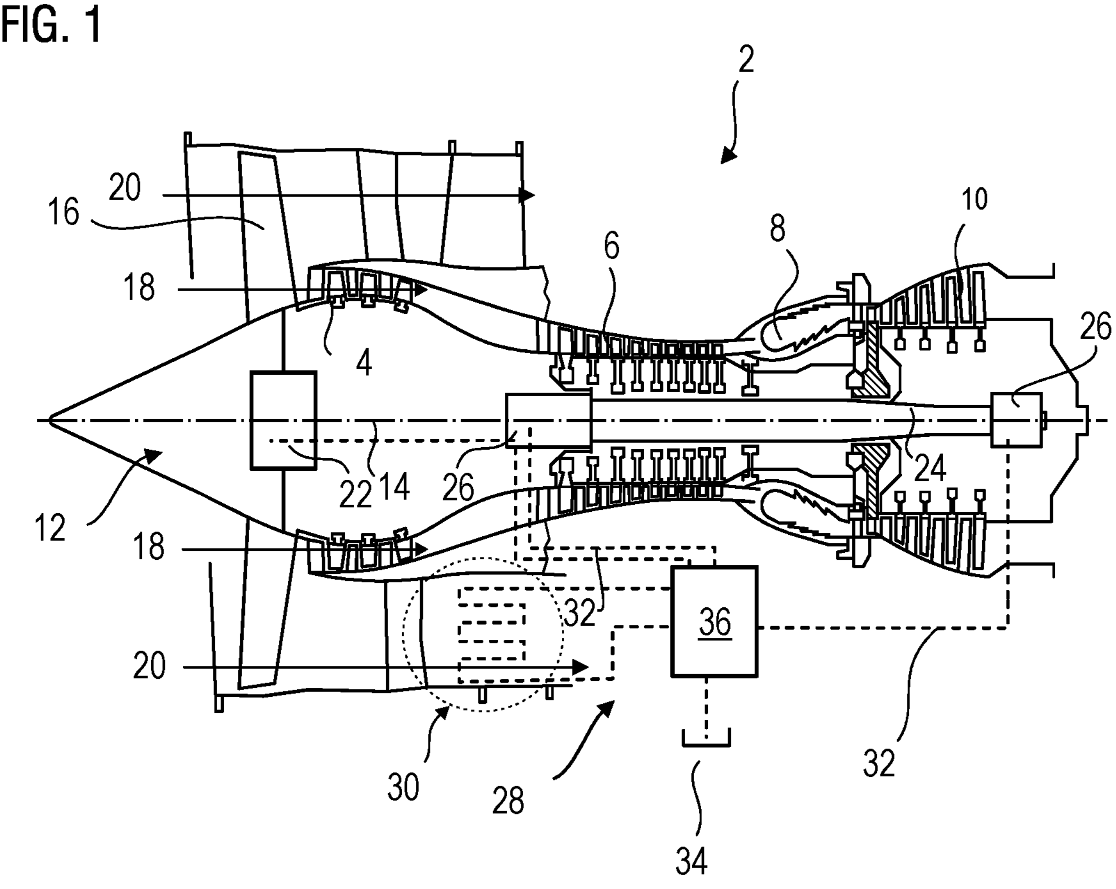
FIG. 1 represents an axial turbomachine according to the invention.

FIG. 1 represents an example of a double-flow turbojet. The turbojet 2 comprises a low-pressure compressor 4, a high-pressure compressor 6, a combustion chamber 8 and one or more levels of turbines 10. In operation, the mechanical power of the turbines 10 is transmitted via shafts to the rotor 12 and sets in motion the two compressors 4 and 6. The rotation of the rotor around its axis of rotation 14 makes it possible to generate an air flow and to progressively compress the latter until it enters the combustion chamber 8.

A fan 16 is coupled to the rotor 12 and generates an air flow which is divided into a primary flow 18 passing through the different aforementioned levels of the turbomachine, and a secondary flow 20 passing through an annular duct. Reduction means 22 can reduce the rotational speed of the fan 16 and/or the low-pressure compressor 4 relative to the speed of the associated turbine 10.

The rotor 12 comprises several coaxial shafts 24 supported by bearings 26. The cooling and/or lubrication of the bearings 26 and the optional reduction gear 22 are ensured by a lubrication circuit 28. The lubrication circuit 28 may include a heat exchanger. heat 30 to cool the oil whose temperature can exceed 200° C.

The lubrication circuit 28 may include oil recovery lines 32 collecting the oil in the lubrication enclosures of the bearings 26 and conveying it to the reservoir 34. It may also include a line 32 for recovering the lubricating oil the reducer 22 and returning this oil to the tank 34.

In order to force the circulation of the oil during its recovery, the lubrication circuit 28 can include a lubrication group 36. The lubrication group 36 is a unit composed of a one-piece body which accommodates several hydraulic functions such as for example several pumps and filters. It pressurizes the oil taken from the tank and distributes it to the engine components which need to be lubricated. Then, the lubrication group 36 reconditions the oil (cooling, filtration, monitoring) and returns it to the tank 34.

Figure 2:
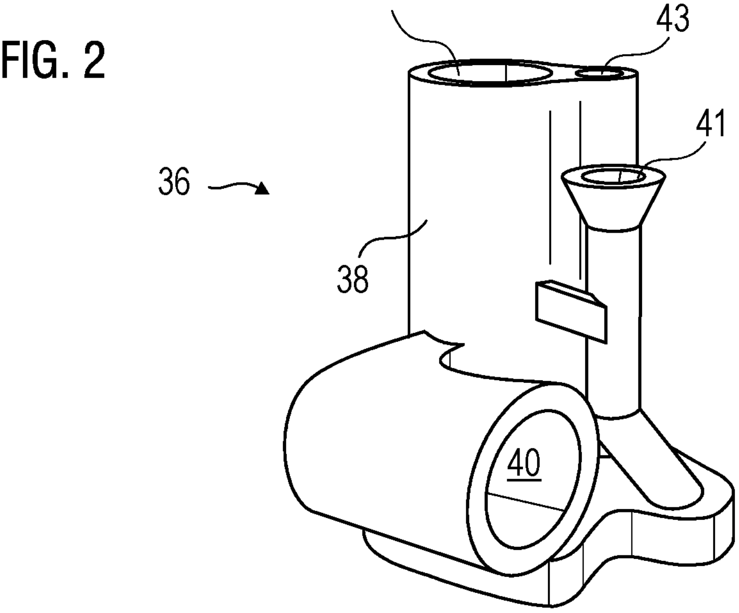
FIG. 2 illustrates an isometric view of the body of a lubrication group.

FIG. 2 illustrates an example in isometric view of a body 38 of lubrication group 36.

The body 38 can be manufactured by additive manufacturing and be of particularly complex shape. The body 38 can be in one piece. It may include several oil inlets 40, 42 to suck the oil from the reservoir or from the components of the turbomachine and several oil outlets 41, 43 to discharge the oil towards the reservoir or towards the components of the turbomachine. Respective passages connect the entrances to the exits. Some passages may be completely independent of other passages.

Group 36 can be equipped with numerous functions and contain several pumps and several filters. According to the invention, group 36 can also contain a ferromagnetic debris detection system.

Figure 3:
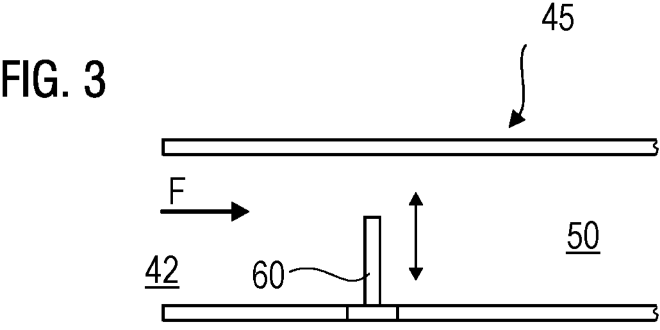
FIG. 3 shows an example of a debris detection system according to the invention.

FIG. 3 schematically shows a debris detection system 45 according to the invention. A passage 50, for example in the vicinity of the entrance 42, accommodates an attraction and detection module 60 of ferromagnetic particles. This protrudes into passage 50. It can occupy the entire height/width of the passage or less. Its projecting length and orientation can be adjusted mechanically by appropriate means (electric motor, screw, piston, etc.).

The detection system 45 makes it possible to detect the presence and/or circulation of ferromagnetic debris, or ferromagnetic particles, contained in the oil. This debris can in particular result from wear of a bearing or wear of a gear tooth of the reducer 22.

Module 60 can be connected to a signal processing unit (not shown). The processing unit manages to identify the presence of debris at each pipe. Detectable debris can be between 50 μm and 1000 μm in size, or between 150 μm and 750 μm.

Figure 4:
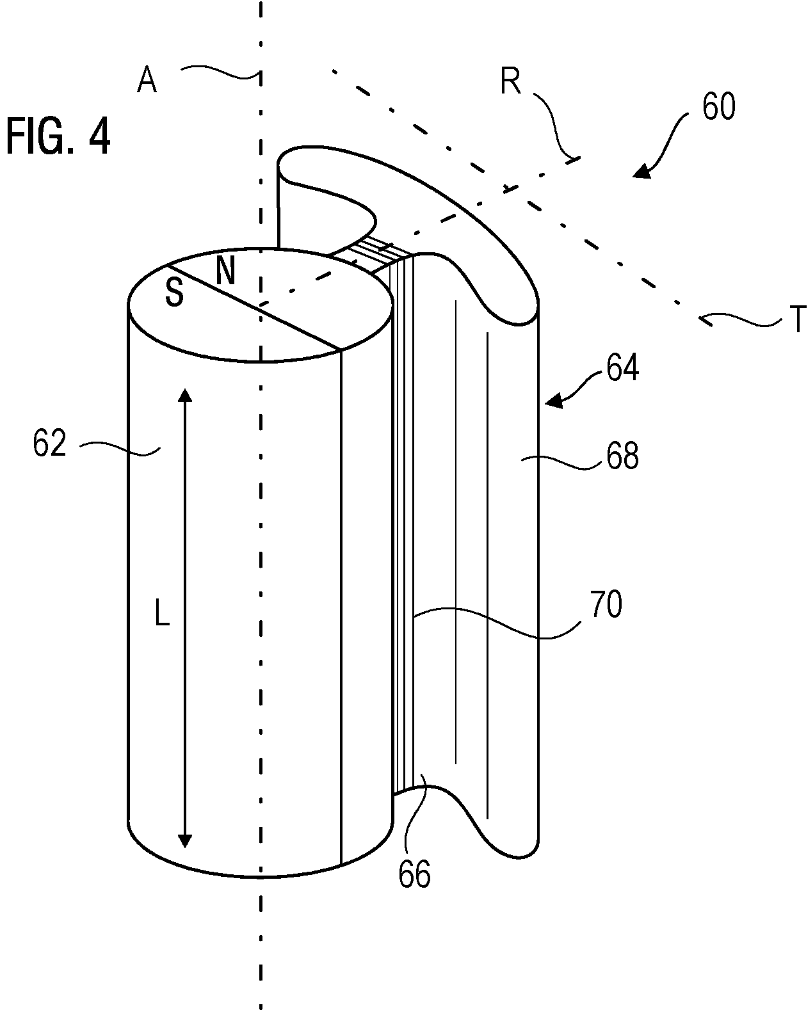
FIG. 4 shows a debris attraction and detection module according to the invention.

FIG. 4 shows an example of a detection module 60. The module 60 comprises a magnet 62 of cylindrical shape and axis A. The magnet can be of the NdFeB type and preferably SmCo (Samarium-Cobalt), retaining its properties at a temperature of 350° C.

The magnet is chosen not to be too powerful, so as not to capture all the particles and saturate the detection module. The main objective remains statistical detection and monitoring of the increase in the number of particles. For example, the magnet could be chosen according to the oil flow it encounters. A magnet with a coercivity of around 800 kA/m could be chosen to target particles with a size of around 500 microns.

In the following, the references "axial", "radial" and "circumferential" relate to the magnet 62, "axial" being understood as parallel to the axis A, "radial" being understood as perpendicular to the axis A and "circumferential" being such that the axial, radial and circumferential directions form a cylindrical coordinate system (A, R, T).

The module 60 further comprises a ferromagnetic bar 64 (for example made of M50 steel) attached to the magnet 62. The bar 64 can extend over the entire axial length L of the magnet 62.

The bar 64 comprises a foot 66 rising radially from the magnet 62 and a cap 68 extending circumferentially on either side of the foot 66.

A coil 70 is wound around the foot 66. The coil 70 can include several tens or hundreds of turns. The coil 70 detects variations in the magnetic field: when a ferromagnetic particle attracted by the bar 64 passes near the magnet 62, the magnetic field generated by the magnet 62 is disturbed and these disturbances are measured by the coil 70.

The magnet 62 has the dual role of attracting the ferromagnetic debris found in the oil flow (attraction amplified by the bar 66) and of generating a magnetic field detectable by the coil 70.

Generally speaking, the detection technology used is similar, for example, to the technology disclosed in document WO 2017/157855 A1 or in document EP 3 363 518 A1.

Thus, when a ferromagnetic particle arrives near the magnet 62, it modifies the magnetic field and creates discontinuities in the intensity of the coil 70. When the variations exceed a given threshold, the module 60 recognizes that a ferromagnetic particle has passed.

Figures 5, 6:
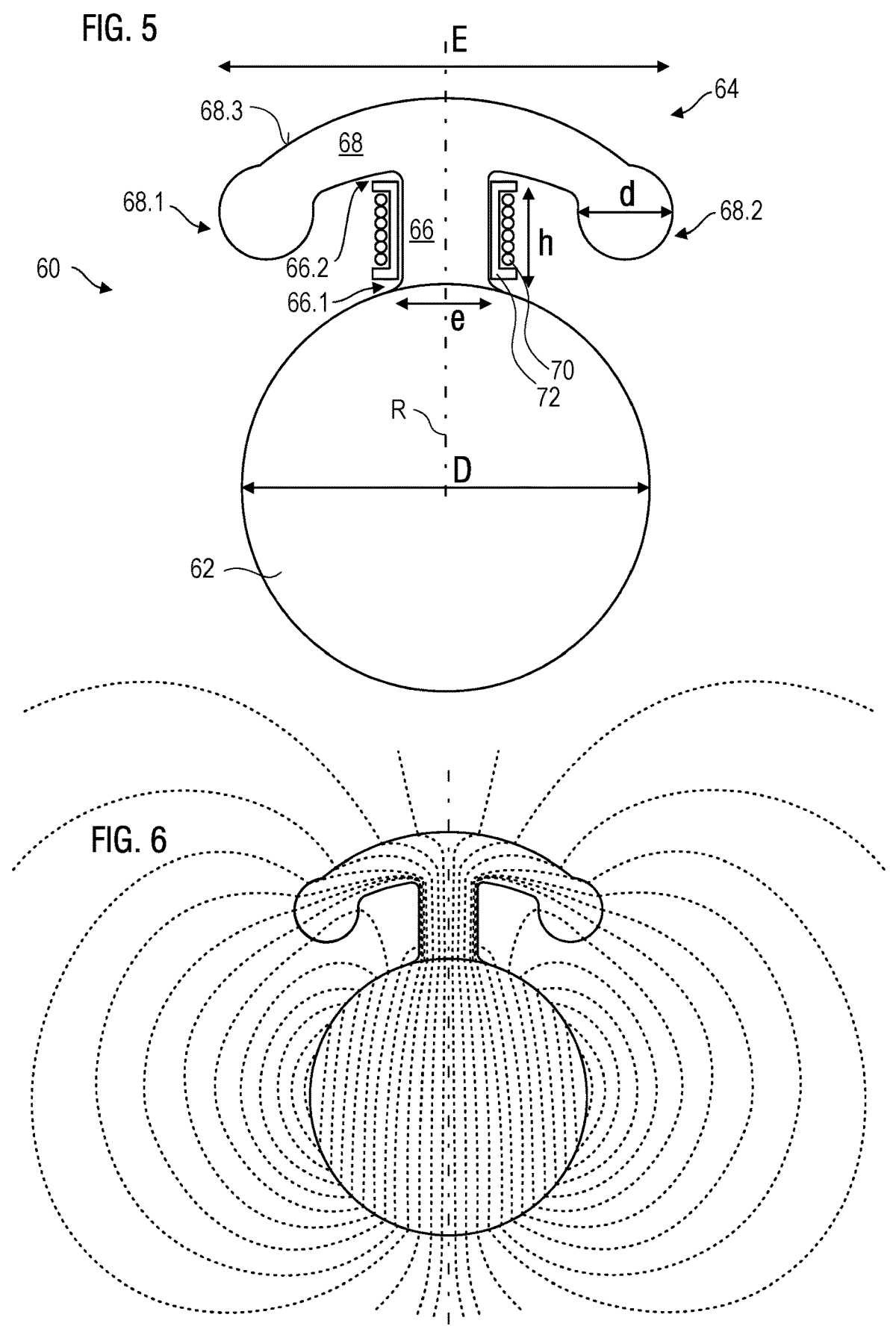

FIG. 5 shows a section of the module 60 in a plane perpendicular to the axis A. It can be seen that the bar 64 can have a "mushroom" shaped section.

The magnet 62 can have a diameter D of approximately 5 mm.

The foot 66 has a circumferential width e and a radial height h. The width e characterizes the concentration of the field lines. The height h materializes the radial distance between the cap 68 and the magnet 62.

The width e can be between 25% and 50% of the diameter D of the magnet 62, and be worth for example approximately 2.5 mm. The cap 68 extends radially with a width E approximately equal to the diameter D.

The radial height h can be approximately 50% of the diameter D of the magnet 62, the cap thus being distant from the center of the magnet by 4 to 6 mm, and in particular by 4.6 mm.

In a preferred embodiment, the ends 68.1 and 68.2 of the cap 68 have the shape of a cylinder portion of diameter d.

In one embodiment, the value of d may be approximately equal to e. The values of d and e can for example be between 1.5 and 2.5 mm, and are preferably worth around 1.75 mm or around 2 mm.

In a variant, the distance between the two centers of the cylinder portions 68.1, 68.2 is between 5 and 7 mm, preferably 6.5 mm.

The coil 70 can be housed in grooves provided in the foot 66 or alternatively, as shown in FIG. 5, a cage 72 of non-magnetic material can confine the coil 70. The cage 72 can thus be a support for the coil, threaded around foot 66.

In an embodiment not illustrated, the module includes an additional coil, called "Built-in test" making it possible to generate a magnetic field and check the response of the coil 70, for example before starting up a turbojet.

The radially external surface 68.3 of the cap 68 as well as the cylinder portions 68.1, 68.2 constitute the debris attraction surfaces. They are particularly advantageous for attracting particles because they have a large surface area with a small footprint.

The surface 68.3 can be generally cylindrical with a diameter twice that of the magnet, for example 10 mm.

FIG. 6 shows the field lines of the magnetic field generated by the magnet. This figure highlights in particular the concentration of the field lines across the foot 66.

Figure 7:
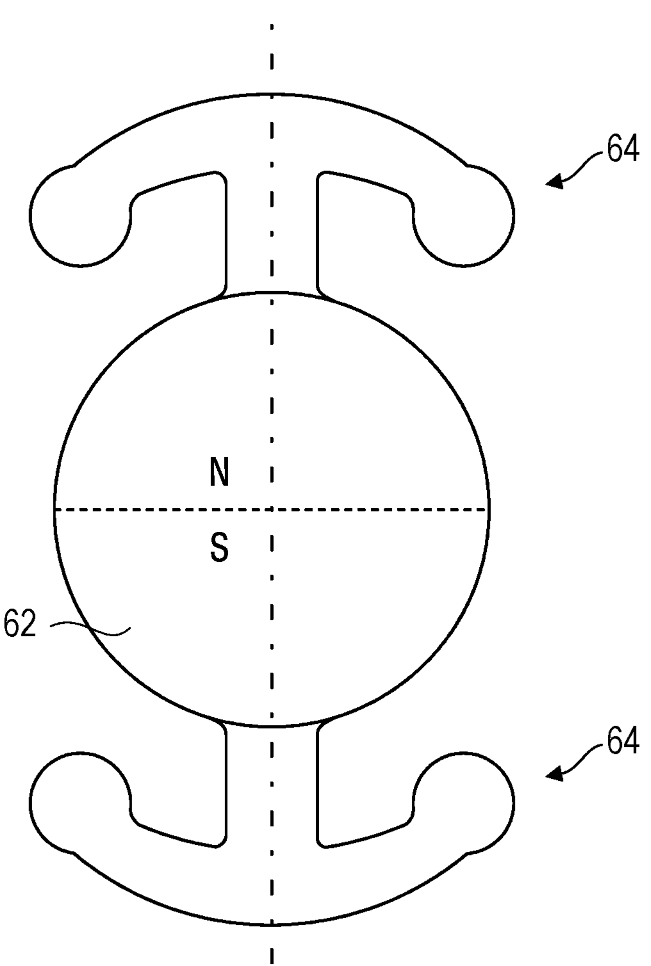
FIG. 7 shows a variant of the attraction and detection module.

FIG. 7 illustrates an alternative where two bars 64 are arranged diametrically on each side of the magnet 62. The bars 64 can be positioned to the right of the N/S poles of the magnet.

Figure 8:
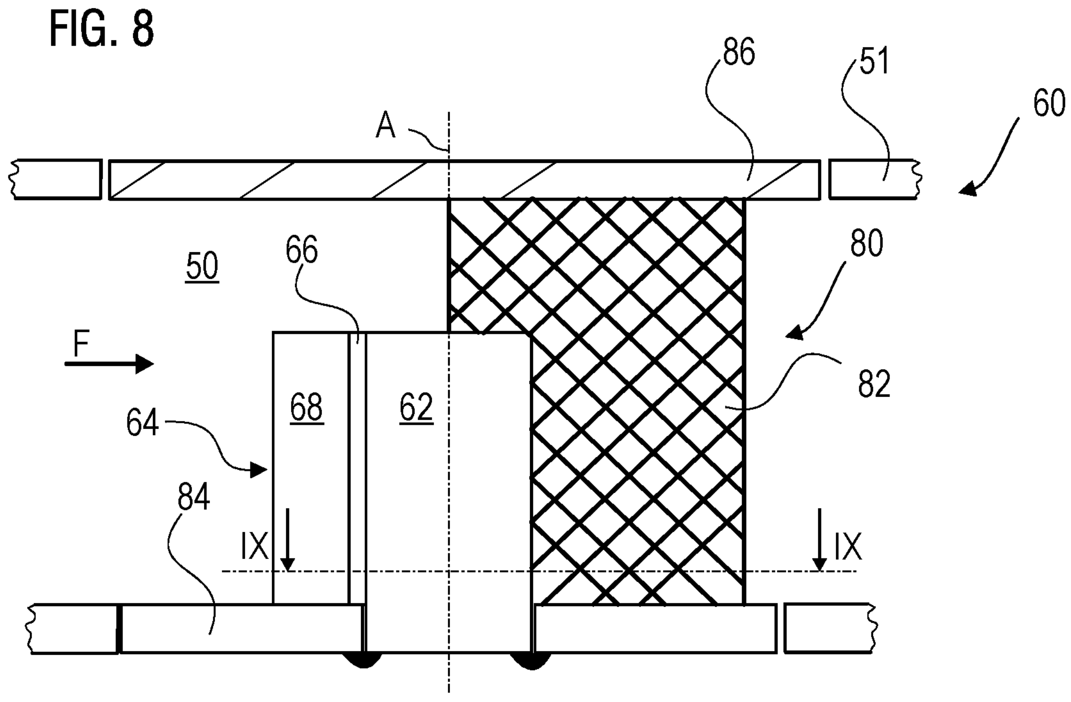
FIGS. 8 and 9 show a module comprising a strainer.

FIG. 8 shows an implementation of the module 60 with a strainer 80. The strainer comprises a filtration mesh 82 extending from a base 84 towards a ceiling 86. The base 84 and the ceiling 86 can correspond to an orifice made in a pipe 51 delimiting the passage 50. Alternatively, the strainer may occupy only part of the passage 50. Suitable joints and mounting means (not shown) may be provided.

The magnet 62 and the bar 64 can be welded to the base 84 of the strainer 80.

Alternatively, a tight or crimped assembly can be used. The mesh 82 can take the form of a cylinder or a portion of a cylinder, for example extending over 180° around the axis A. The mesh 82 and the magnet 62 are advantageously coaxial.

The mesh size of the mesh 82 can be greater than or equal to 500 μm, to prevent the largest particles (greater than a size of the order of 500 to 1000 μm) from damaging the pumps. Filtration elements placed downstream of the pumps can be provided to protect the motor components (injectors, enclosures) with filtration of the order of 10 to 150 μm.

The strainer 80 can be made entirely, including with its mesh 82, by additive manufacturing.

The axis A intersects the main direction of the flow F, preferably perpendicular.

The magnet 62 and the bar 64 extend over all or part of the height of the strainer 80.

Figure 9:
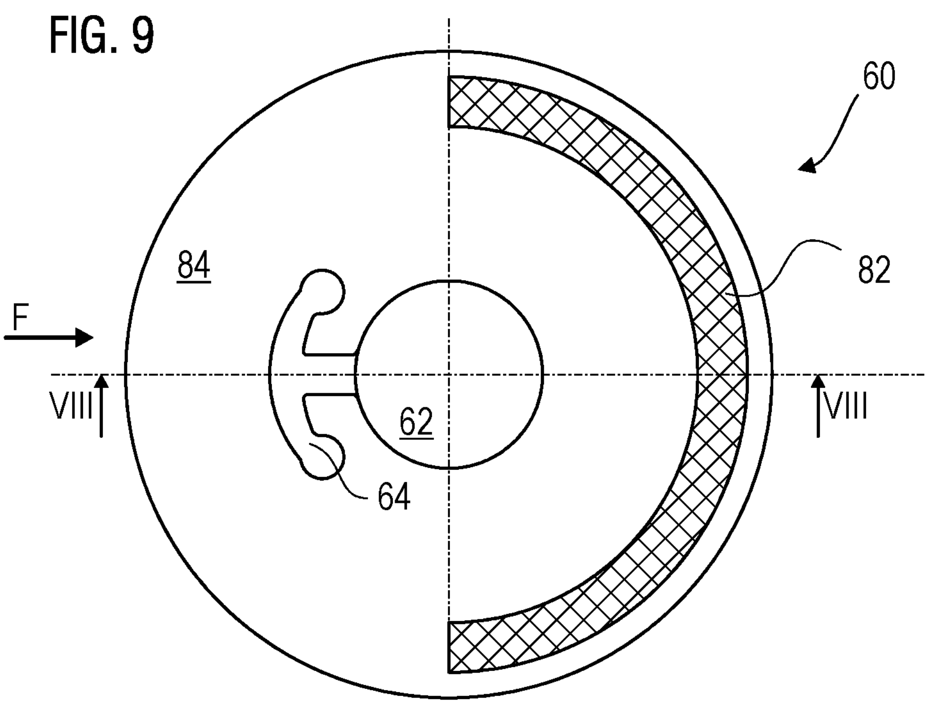

FIG. 9 illustrates these aspects in a sectional view along the axis IX:IX of FIG. 8.

In this example, the flow F first encounters the bar 64, then the magnet 62, then the mesh 82. Alternatively, another orientation around the axis A can be favored for the bar 64 and the magnet 62.

FIG. 9 also shows the order of magnitude of the ratio between the diameter of the magnet 62 and that of the mesh 82 which can be of the order of 3.

In an embodiment not illustrated, the module 60 is arranged in an elbow of a pipe such that the axis A is substantially parallel to the flow.

Figure 10:
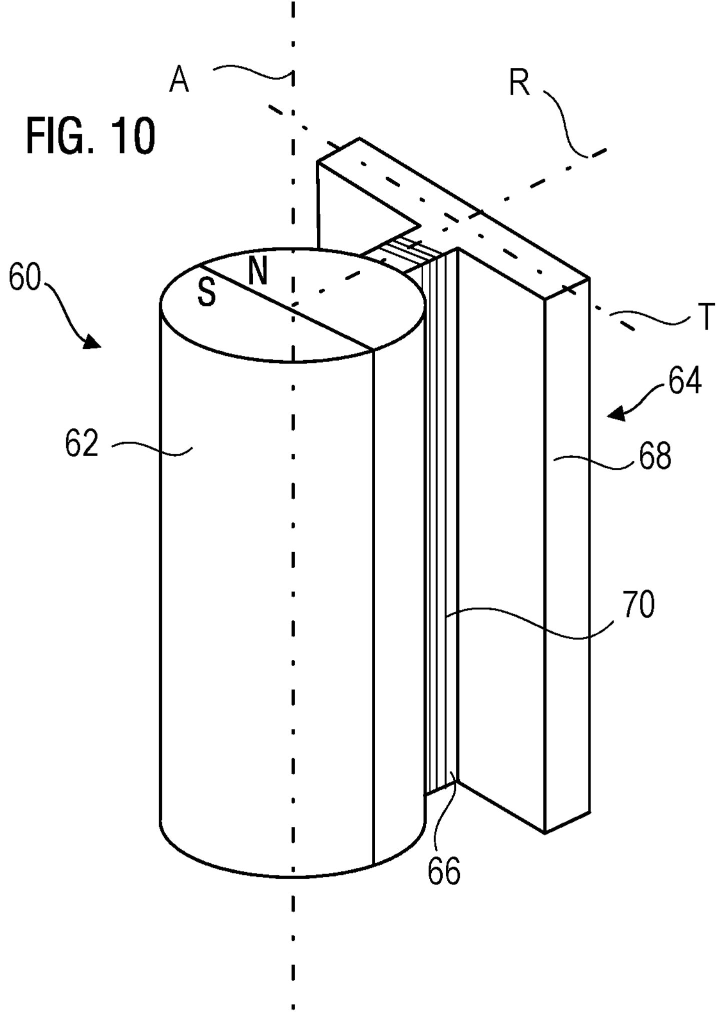
FIG. 10 illustrates an alternative with a parallelepiped cap.

FIG. 10 illustrates an alternative in which the hat is of parallelepiped shape. Such a design has substantially the same advantages as the shape described in FIGS. 4 to 9.

The different aspects presented in FIGS. 4 to 9 can be applied to such a magnet, in particular semi-cylindrical ends and ends of such a magnet can be planar or semi-cylindrical, the dimension ratios, the presence of two magnets at 180°, integration into a strainer, etc.

The invention claimed is:

1. A module for attracting and detecting ferromagnetic debris in an oil flow of a turbomachine, the module comprising:

a permanent magnet of a cylindrical shape;

a ferromagnetic bar comprising a foot rising radially from the magnet and a cap extending circumferentially from, or perpendicular to the foot; and a coil wound around the foot;

wherein the cap comprises two ends circumferentially opposite and each formed of a cylinder portion.

2. The module according to claim 1, wherein the coil is wound around a winding support threaded onto the foot.

3. The module according to claim 1, wherein the two ends are spaced from each other by a distance substantially equivalent to the diameter of the magnet.

4. The module according to claim 1, wherein the cylinder portions forming the two ends each comprise a diameter which is approximately equal to a circumferential width of the foot and is between 1.5 and 2.5 mm.

5. The module according to claim 1, wherein the foot comprises a circumferential width which is between 25% and 50% of a diameter of the magnet.

6. The module according to claim 1, wherein the foot comprises a radial height which is approximately 50% of a diameter of the magnet.

7. The module according to claim 1, wherein the ferromagnetic bar comprises an axial length which is equal to an axial length of the magnet.

8. The module according to claim 1, wherein the ferromagnetic bar is a first bar, the module comprising a second bar arranged diametrically opposite to the first bar, with respect to the cylindrical magnet.

9. The module according to claim 8, wherein the magnet comprises two diametrically opposed poles, each bar being radially aligned with a respective pole.

10. The module according to claim 1, wherein said module further comprises a strainer describing at least one cylindrical portion, the at least one cylindrical portion having a cylinder axis coaxial with an axis of the cylindrical shape of the magnet.

11. A system for detecting ferromagnetic debris in an oil flow of a turbomachine, the system comprising a passage intended to be traversed by the flow and a module for attracting and detecting the ferromagnetic debris present in the flow, wherein the module comprising:

a permanent magnet of a cylindrical shape;

a ferromagnetic bar comprising a foot rising radially from the magnet and a cap extending circumferentially from, or perpendicular to the foot; and a coil wound around the foot;

wherein the cap comprises two ends circumferentially opposite and each formed of a cylinder portion.

12. The system according to claim 11, wherein the module is positioned in the passage in such a way that an axis of the cylindrical shape is perpendicular to a direction of the oil flow in the passage, the cap being arranged upstream of the magnet.

13. An aircraft turbojet engine comprising a lubrication group made of a one-piece body receiving a plurality of pumps and filters, and a plurality of oil inlets and outlets, and a system for detecting debris, wherein the system for detecting debris comprising a passage intended to be traversed by the flow and a module for attracting and detecting the ferromagnetic debris present in the flow, wherein the module comprising:

a permanent magnet of a cylindrical shape;

a ferromagnetic bar comprising a foot rising radially from the magnet and a cap extending circumferentially from, or perpendicular to the foot; and a coil wound around the foot;

wherein the cap comprises two ends circumferentially opposite and each formed of a cylinder portion; and wherein said system for detecting debris is arranged in one of the oil inlets upstream of the pumps and filters.

* * * * *